(12) United States Patent
Nalini et al.

(10) Patent No.: US 7,871,059 B2
(45) Date of Patent: Jan. 18, 2011

(54) VALVE FOR ADJUSTING THE FLOW-RATE OF FLUIDS, PARTICULARLY REFRIGERATION FLUIDS

(75) Inventors: Luigi Nalini, Padua (IT); Andrea Dalan, Cadoneghe (IT)

(73) Assignee: Carel S.p.A., Brugine (IT)

( * ) Notice: Subject to any disclaimer, the term of this patent is extended or adjusted under 35 U.S.C. 154(b) by 361 days.

(21) Appl. No.: 11/525,962

(22) Filed: Sep. 25, 2006

(65) Prior Publication Data

US 2007/0090316 A1 Apr. 26, 2007

(30) Foreign Application Priority Data

Oct. 20, 2005 (IT) .............................. PD05A0312

(51) Int. Cl.
*F16K 31/02* (2006.01)
(52) U.S. Cl. .................................. 251/129.11
(58) Field of Classification Search ............ 251/129.11, 251/129.12, 129.13
See application file for complete search history.

(56) References Cited

U.S. PATENT DOCUMENTS

| | | | | |
|---|---|---|---|---|
| 4,274,444 A | * | 6/1981 | Ruyak | .................... 137/630.14 |
| 4,339,737 A | * | 7/1982 | Meyers et al. | ................ 335/272 |
| 4,763,874 A | * | 8/1988 | Ogawa | ........................ 251/122 |
| 5,389,012 A | * | 2/1995 | Huang | ......................... 439/583 |
| 6,250,602 B1 | | 6/2001 | Jansen | |
| 6,299,129 B1 | * | 10/2001 | Suzuki et al. | ........... 251/129.11 |
| 6,433,448 B1 | * | 8/2002 | Hatton | ..................... 310/67 R |
| 6,492,751 B1 | * | 12/2002 | Childs et al. | .................. 310/71 |

FOREIGN PATENT DOCUMENTS

| | | |
|---|---|---|
| EP | 0 937 928 A | 8/1999 |
| EP | 1 473 496 A2 | 11/2004 |

* cited by examiner

*Primary Examiner*—John K Fristoe, Jr.
(74) *Attorney, Agent, or Firm*—Modiano & Associati; Albert Josif; Daniel J. O'Byrne

(57) ABSTRACT

A valve for adjusting the flow-rate of fluids, servo-controlled by an electric motor having within a hermetic enclosure capsule and supported rotatably with a support for reducing rotary friction, the rotor component of the electric motor with a screw-and-nut coupling with a flow control element restrained to perform only axial translational motions in a valve body provided with intake and discharge ports and fixed coaxially to the capsule. The support is provided by a radial bearing and associated with the rotor component in a position corresponding to the portion of the rotor component inside which the screw-and-nut coupling is provided.

27 Claims, 5 Drawing Sheets

VALVE FOR ADJUSTING THE FLOW-RATE OF FLUIDS, PARTICULARLY REFRIGERATION FLUIDS

The present invention relates to a valve for adjusting the flow-rate of fluids, particularly refrigeration fluids.

BACKGROUND OF THE INVENTION

Expansion valves are currently commonly used in compression-type refrigeration circuits.

In particular, two-way valves are used to control the flow of refrigerant by means of an orifice and a flow control element, which is preferably actuated by means of an electric motor drive.

These thermostatic expansion valves are designed to control the flow of refrigerant that circulates.

A flow-rate adjustment valve for fluids, particularly refrigeration fluids, servo-controlled with an electric motor has been devised and is disclosed in EPA-99101786.4 of 15 Feb. 1999 and in U.S. Ser. No. 09/250,251 of 16 Feb. 1999.

Said valve comprises a valve body provided with intake and discharge ports, which is closed reversibly by a flow control element; the valve has a driver section for actuating and adjusting the flow control element, in which the rotor component of the motor is supported rotatably within a hermetic capsule which is fixed to the valve body.

The rotor component, which is fixed axially, has a screw-and-nut coupling to a part of the flow control element, which is rigidly coupled to the valve body so as to perform only axial translational motions.

Said valve is capable of providing a fine adjustment of the degree of closure without triggering dangers of damage or wear of the edges related to the orifice to be closed.

Another particularity of said valve is that it can be adapted also to refrigeration systems that have already been installed and ensures in the most absolute way an outward hermetic seal for the refrigeration fluids that flow therein.

Although this valve is appreciated and widespread, it has aspects that can be improved.

A first important drawback is the mismatch of the position of the means for reducing rotary friction, generally a ball bearing, that support the rotor component, with respect to the coupling between the threaded portion of the stem of the flow control element and the corresponding female thread formed inside the rotor component.

This mismatch in an axial direction of the screw-and-nut coupling with the position of the ball bearing causes the radial components of the pressure applied by the fluid to the tip of the open flow control element to be imperfectly balanced by the contrasting axial thrust of the bearing, consequently generating a torque which misaligns the axis of the flow control element with respect to the correct direction of advancement and with respect to the correct axis of rotation.

This misalignment can compromise the correct and efficient operation of the valve, because it leads to friction of the magnetic cylindrical element of the rotor component against the internal surface of the capsule and simultaneously, by offsetting axially the rotor component with respect to the stator component of the electric motor, it prevents the optimum closure of the magnetic circuit on these components, with consequent irregularities for the opening-closing movement of the flow control element.

Further, said known valves have different dimensions depending on the uses for which they are intended, with consequent differentiation in the shape and dimensions of the flow control elements provided therein.

This differentiation among flow control elements of valves, which are equivalent in terms of functionality but are dimensionally different, entails as many different operating sequences as there are flow control element models, with consequent management costs for both storage and assembly.

SUMMARY OF THE INVENTION

The aim of the present invention is to provide a valve for adjusting the flow-rate of fluids, particularly refrigeration fluids, which is capable of obviating these and other drawbacks of known types of valve.

Within this aim, an object of the present invention is to provide a valve in which the flow control element rotates and performs a translational motion correctly with respect to its axis of rotation and its direction of advancement.

Another object of the present invention is to provide a valve which is more standardized in its components with respect to known types of valve, with a consequent reduction of the cost of the product.

Another object of the present invention is to provide a valve whose technical and mechanical capabilities are not inferior to those provided by known valves.

Another object of the present invention is to provide a valve which is particularly flexible in terms of application and can also be adapted to refrigeration systems that have already been installed.

Another object of the present invention is to provide a valve whose assembly is not more complex than that of known types of valve.

Another object of the present invention is to provide a valve for adjusting the flow-rate of fluids, particularly refrigeration fluids, which can be manufactured cheaply with known systems and technologies.

This aim and these and other objects, which will become better apparent hereinafter, are achieved by a valve for adjusting the flow-rate of fluids, particularly refrigeration fluids, which is servo-controlled by means of an electric motor, of the type that comprises, within a hermetic enclosure capsule and supported rotatably with means for reducing rotary friction, the rotor component of said electric motor with a screw-and-nut coupling with a flow control element which is restrained so as to perform only axial translational motions in a valve body provided with intake and discharge ports, said valve body being fixed coaxially to said capsule, said valve being characterized in that said means for reducing rotary friction are associated with said rotor component in such a position as to affect the portion of the rotor component inside which said screw-and-nut coupling is provided.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein.

DESCRIPTION OF THE PREFERRED EMBODIMENTS

Figure 1:
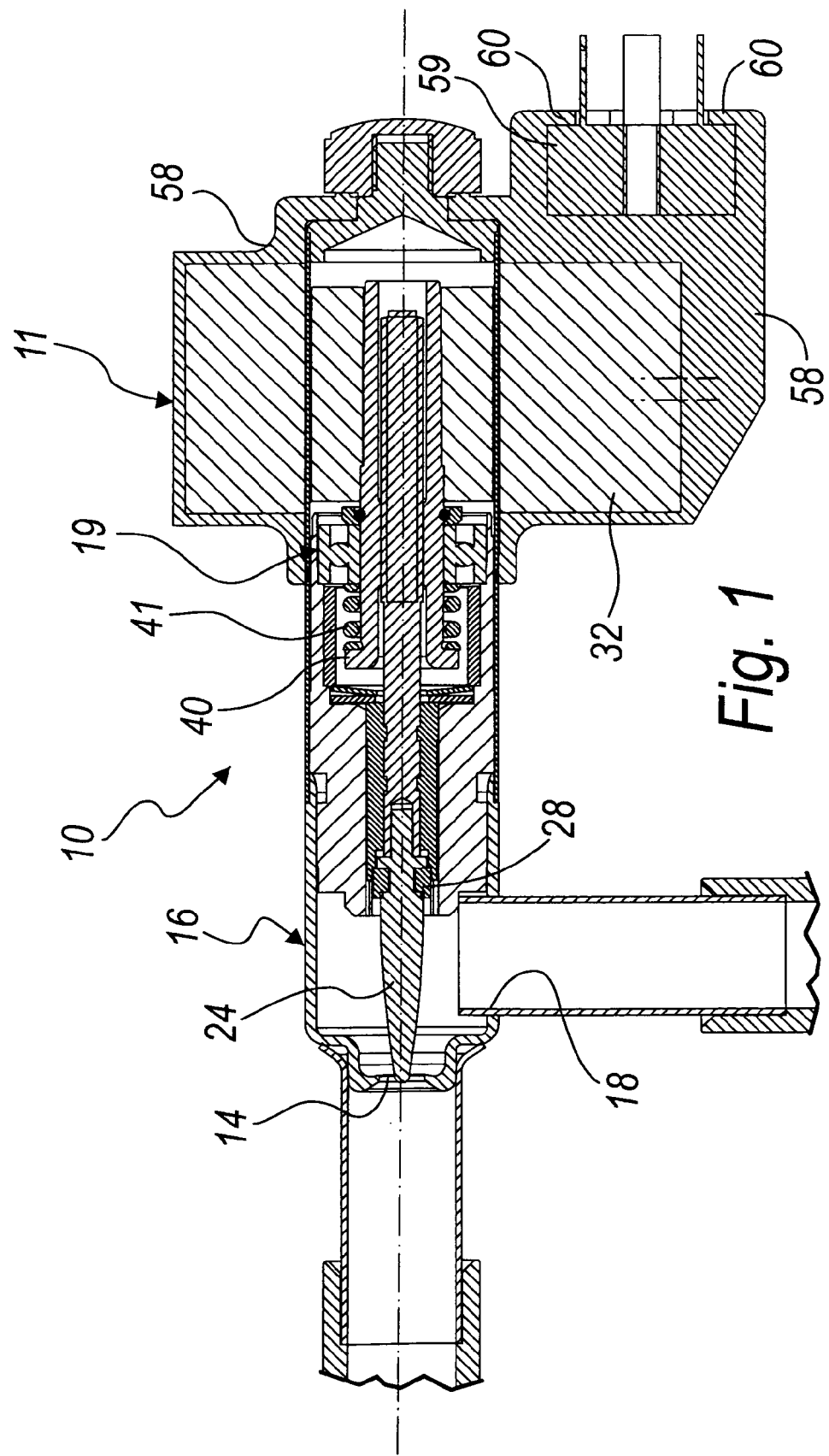
FIG. 1 is a sectional side view of a valve according to the invention in a first embodiment.
Figure 2:
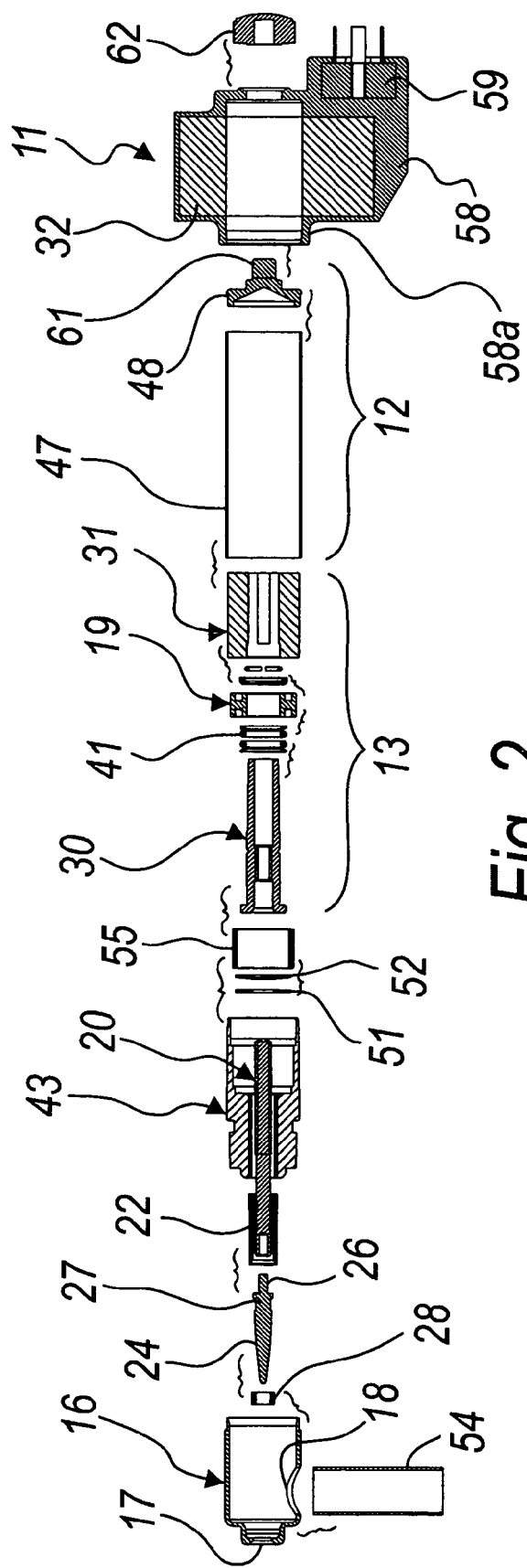
FIG. 2 is an exploded sectional side view of the valve in the first embodiment of FIG. 1.
Figure 3:
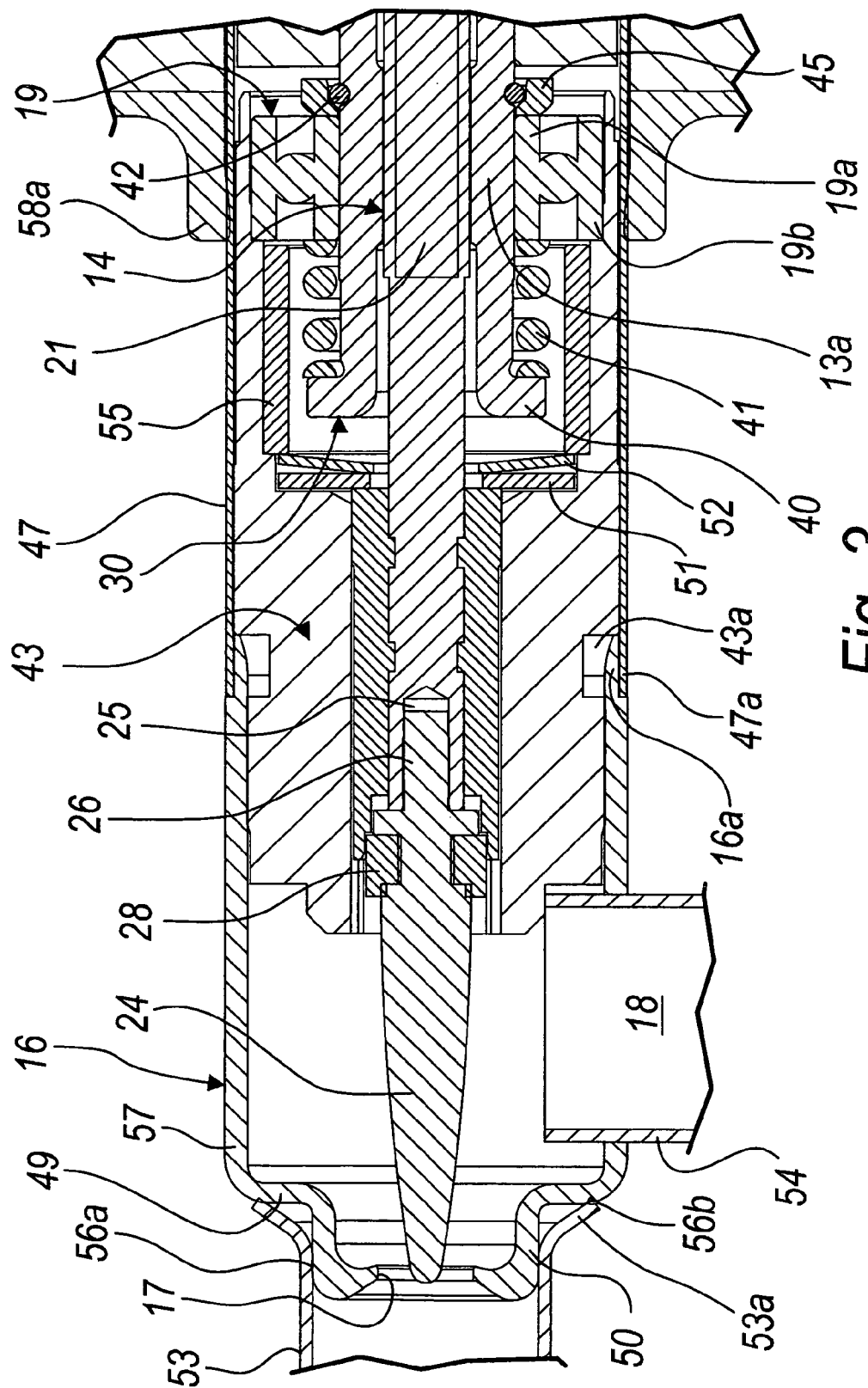
FIG. 3 is a view of a detail of FIG. 1.
Figure 4:
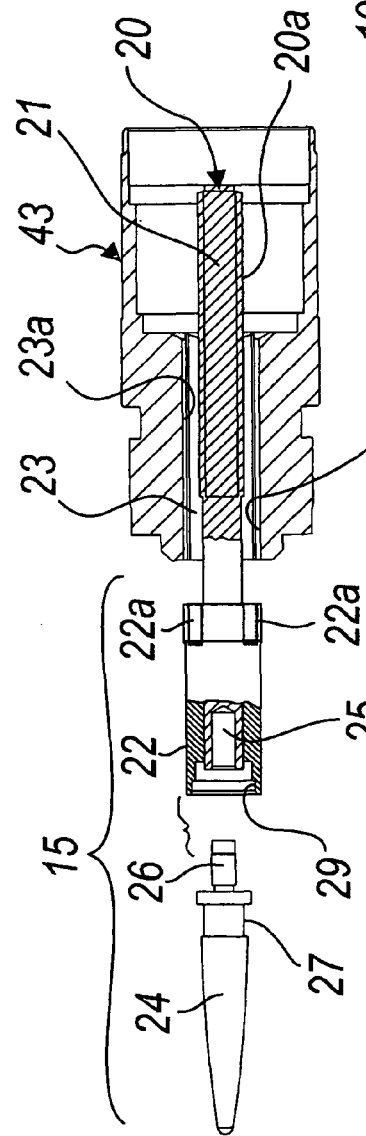
FIG. 4 is a view of a first detail of FIG. 2.
Figure 5:
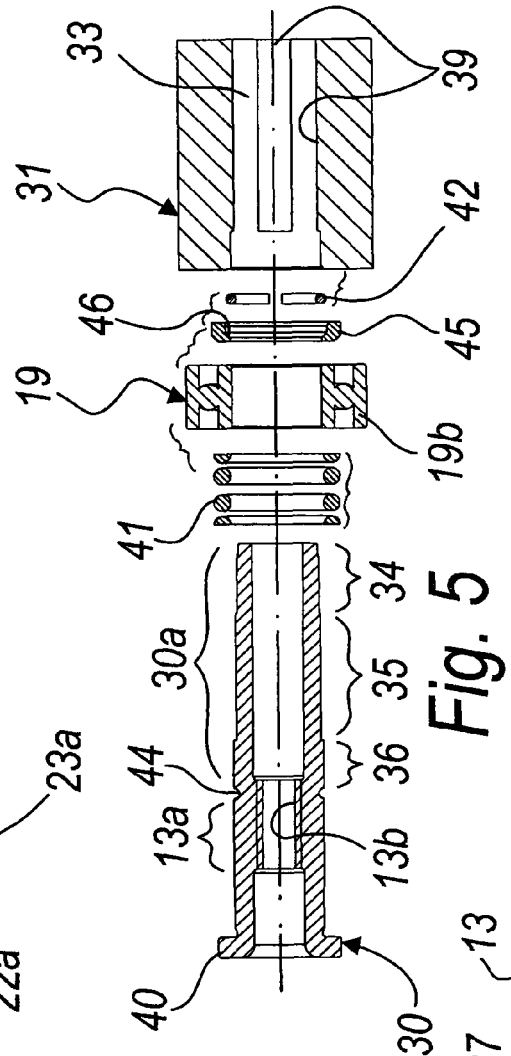
FIG. 5 is a view of a second detail of FIG. 2.
Figure 6:
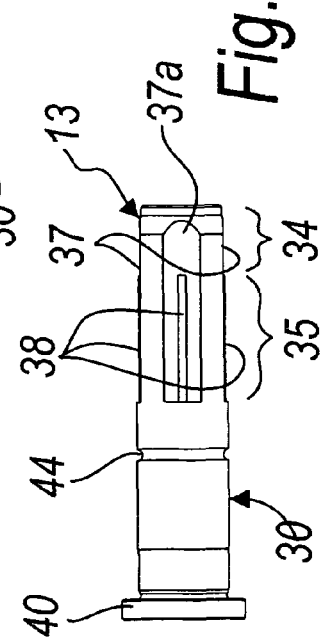
FIG. 6 is a side view of a component of the valve according to the invention.

With reference to the figures, a valve for adjusting the flow-rate of fluids, particularly refrigeration fluids, according to the invention, is generally designated by the reference numeral 10.

The valve 10 is servo-controlled with an electric motor 11, which in the embodiment described here is a two-pole electric step motor.

The valve 10 comprises, within a hermetic enclosure capsule 12, a rotor component 13, described in greater detail hereinafter, of the electric motor 11.

The rotor component 13, which is supported rotatably with supporting means for reducing rotary friction, has a screw-and-nut coupling 14 with a flow control element 15.

The flow control element 15 is restrained so as to perform only axial translational motions in a valve body 16 provided with an intake port 17 and a discharge port 18.

The valve body 16, described in greater detail hereinafter, is fixed coaxially to the capsule 12.

The supporting means for reducing rotary friction are provided by a radial bearing 19.

The radial bearing 19 is associated with the rotor component 13 in such a position as to affect the portion 13a of the rotor component 13 inside which the screw-and-nut coupling 14 is formed.

The flow control element 15 is constituted by a stem 20 with a threaded shank 21 and a needle-shaped opposite flow control end.

A rotation-preventing alignment insert 22 is overmolded on the stem 20 proximate to the flow control end and is provided with edges 22a which are adapted to slide within complementarily shaped slots 23a provided within a guiding hole 23 formed in a cup-shaped body 43 for guiding the flow control element 15 and connecting the capsule 12 and the valve body 16.

Said mutual position of the bearing 19 and of the screw-and-nut coupling 14 causes the radial thrusts generated by the pressure of the fluid on the flow control end in the position for not closing the respective fluid passage port 17 to be balanced by the contrasting radial thrust of the bearing 19 without producing axial offsetting torques for the axis of the flow control element 15.

Conveniently, the radial bearing 19 is of the type with a ring of balls and is chosen so that it can withstand the axial thrusts as much as the axial bearings used in known types of valve, and its axial size is such that the outer ring 19b is capable of contrasting any misalignment torques for the rotation axis.

In known types of valve, the use of an axial bearing instead of a radial one and the spacing between the threaded coupling and the bearing allow an oscillation of the flow control element which despite being limited entails the mentioned drawbacks.

Solving the problem of axial offset allows the correct operation of the valve, preventing the magnetic cylindrical element 31 of the rotor component 13 (suitable to be crossed by the magnetic field generated by the stator component 32 of the electric motor 11) from making contact with the internal surface of the capsule 12 and allowing the correct magnetic concatenation between the rotor component 31 and the stator component 32.

Accordingly, the flow control element is capable of closing in an optimum manner the respective passage port 17.

Further, the radial bearing 19 is of a commercially known type, and its use helps to lower the overall cost of the valve 10 with respect to known valves.

The threaded portion 20a of the shank 21 of the stem 20 of the flow control element 15 is obtained by rolling, so as to have minimal surface roughness and improve the coefficient of friction with the thread 13b of the tubular body 30 and further reduce play, further limiting the oscillation angle of the flow control element 15.

The flow control end is constituted by a tip 24.

The tip 24, preferably made of stainless steel, is chosen among a plurality of tips having various shapes and dimensions and can be associated by virtue of standardized fixing means with the threaded shank 21, which is also standardized.

The fixing means are constituted by an axial hole 25, which is open at the end of the stem 20 on which the rotation-preventing insert 22 is overmolded; the axial hole 25 accommodates the insertion with interference of a complementarily shaped tail 26 which protrudes from the tip 24.

The tip 24 also has a positioning groove 27 for a gasket 28 suitable to be inserted with interference in a complementarily shaped compartment 29 formed at the end of the rotation-preventing insert 22 through which the tail 26 of the tip 24 passes to engage the stem 20.

The gasket 28, preferably made of polytetrafluoroethylene, Teflon® or neoprene, is adapted to close the corresponding fluid passage port 17 which the tip 24 is suitable to enter.

As mentioned above, the rotor component 13 comprises a tubular body 30, inside which there is the female thread 13b for mating with the threaded shank 21; a magnetic cylindrical element 31 is forced on the outside of the tubular body 30, by interference coupling, and is adapted to be crossed by the magnetic field generated by the stator component 32 of the electric motor 11.

The portion 30a of the tubular body 30, which is designed to engage a corresponding coaxial hole 33 of the magnetic cylindrical element 31, is shaped externally so as to form three contiguous cylindrical regions whose radius increases from the end toward the central part of the tubular body 30:

a first outermost region 34 of insertion with play for alignment during assembly, a second region 35 of insertion with interference in order to engage the tubular body 30 with the magnetic element 31, and a third region 36 within tolerance, suitable to ensure mechanical and magnetic coaxial mating.

The second region 35 of insertion with interference is provided with four longitudinal rotation-preventing flat portions 37.

On each of the flat portions 37 there are interference protrusions 38, which are suitable to undergo deformation upon insertion in the corresponding hole 33 on the magnetic element 31, said hole being provided with corresponding additional flat portions 39.

The flat portions 37 have an inlet bevel 37a, which is adapted to facilitate the insertion of the tubular body 30 within the cylindrical element 31.

The mechanical coupling that joins the tubular body 30 to the magnetic cylindrical element 31 is cheaper and more reliable than an adhesive coupling or a coupling by overmolding, as occurs in some known types of valve.

The tubular body 30 has, at its end directed toward the tip 24 of the flow control element 15, a radially protruding outer annular rim 40 for the abutment of elastic means for preloading the adjacent internal ring 19a of the means for reducing rotary friction, i.e., the radial bearing 19.

The radial bearing 19 requires preloading, which is ensured by the elastic preloading means, which are formed by a helical spring 41 made of stainless steel.

The spring 41 is therefore pressed between the annular rim 40 of the tubular body 30 and the inner ring 19a of the bearing 19 and acts with an elastic force which is calibrated according to the specifications of the bearing 19.

The spring 41 is also designed to cushion any fluid shocks arriving from the hydraulic circuit in which the valve 10 is inserted, said shocks being discharged onto the stem 20 by means of the flow control element 15.

The helical spring 41 and the radial bearing 19 are rigidly coupled to the tubular body 30 by means of a locking ring 42, which is suitable to be arranged in a corresponding groove 44 formed in the tubular body 30.

A force distribution washer 45, also made of stainless steel, is interposed between the ring 42, which is made of stainless steel wire and is cheaply available commercially, and the bearing 19; said washer has, on its internal profile, an inclined bevel 46, against which the locking ring 42 rests; the bevel 46 is adapted to push against the locking ring 42 in a direction for preventing extraction and converging toward the rotation axis of the tubular body 30.

The bevel conveniently has an angle of 45° with respect to the rotation axis.

The tubular body 30 is obtained by molding an engineering polymer which comprises additives adapted to give properties of chemical resistance to the fluids in which the tubular body 30 is immersed and self-lubricating properties with respect to the metallic material with which the tubular body 30 is in contact.

In particular, the engineering polymer of which the tubular body 30 is made contains additives such as Teflon®, graphite and glass fiber.

The magnetic cylindrical element 31 is a 12-pole rotor obtained by compressing an alloy of iron boride and neodymium (NdFeB).

The magnetic cylindrical element 31 is coated with a protective layer of epoxy resin (a few microns thick), which is suitable to protect the ferromagnetic core against chemical attacks and against wear by friction against the internal wall of the capsule 12 inside which the magnetic cylindrical element 31 is arranged so as to rotate.

In addition to protection against chemical attacks, the layer of epoxy resin helps to increase the coupling of the magnetic flux between the cylindrical element 31, i.e., the rotor, and the stator 32 of the step motor 11.

The hermetic capsule 12 is constituted by a cylindrical tubular jacket 47 made of non-magnetic stainless steel, which is closed on the motor side by a bottom 48, which is also made of stainless steel and is sealed thereto by laser welding.

In the constructive example of the invention described here by way of non-limiting example, the valve body 16 is formed by a drawn stainless steel tubular cup, which is shaped so as to accommodate the cup-shaped body 43 for guiding the flow control element 15 and for joining to the jacket 47.

A likewise drawn cylindrical portion 50 protrudes from the bottom 49 of the drawn cup and is provided with an orifice which forms the opening 17 for the passage of the fluid.

The cup-shaped body 43 has an annular groove 43a at the connecting flaps 16a and 47a respectively of the valve body 16 and of the jacket 47.

The annular groove 43a allows to obtain a better welding of the flaps 16a and 47a.

The valve 10 is completed by a supporting washer 51 for a contiguous stainless steel Belleville spring 52 for shock absorption during the step for full opening of the tip 24 with respect to the port 17; a spacer 55 made of anodized aluminum rests against the Belleville spring 52 and its purpose is to keep the Belleville spring 52 in position.

Drawn pipes 53 for the intake and 54 for the discharge of fluid are connected to the valve body 16 at the ports 17 and 18 respectively.

The pipe 53, which is fixed to the valve body 16 at the cylindrical portion 50, has an end 53a which is flared with such a taper as to provide at least two annular regions 56a and 56b for contact and welding with the valve body 16.

A first annular region 56a is formed on the lateral surface of the cylindrical portion 50 and a second annular region 56b is formed on the annular portion of the bottom 49 of the valve body 16 which is arranged between the cylindrical portion 50 and the side wall 57 of the valve body 16.

Said double welding region solves the problem of the axial offset of the port 17 with respect to the tip 24, caused by the application to the pipe 53 of external radial forces during the steps of assembly or fitting of the valve 10, said axial offset preventing optimum closure of the port 17.

The stator component 32 of the electric motor 11 is overmolded with a rubber-like resin which forms a protective sheath 58.

The rubber-like resin is preferably a thermoplastic elastomer (TPE) of the type commercially known by the name Santoprene™.

The protective sheath 58 also incorporates an electrical connection for the phases of the stator component 32.

The electrical connection is advantageously provided by a terminal 59 of the mini-DIN type, which is commercially widespread and is at least partially coated, on its side directed toward an external connection, by one or more flaps of resin 60, which are adapted to provide sealing functions when an external connector is engaged on the terminal 59.

The sheath 58 is overmolded over the bottom so as to form an annular seal around a threaded tab 61 of the bottom 48; a nut 62 made of polyamide screws onto the threaded tab 61 and is adapted to lock the capsule 12 and the rest of the valve 10 to the motor 11.

The sheath 58 has, at the jacket 47, a sealing collar 58a, whose diameter is smaller than the outside diameter of the jacket 47; the collar 58a prevents the flow of fluid toward the inside of the electric motor 11.

Figure 7:
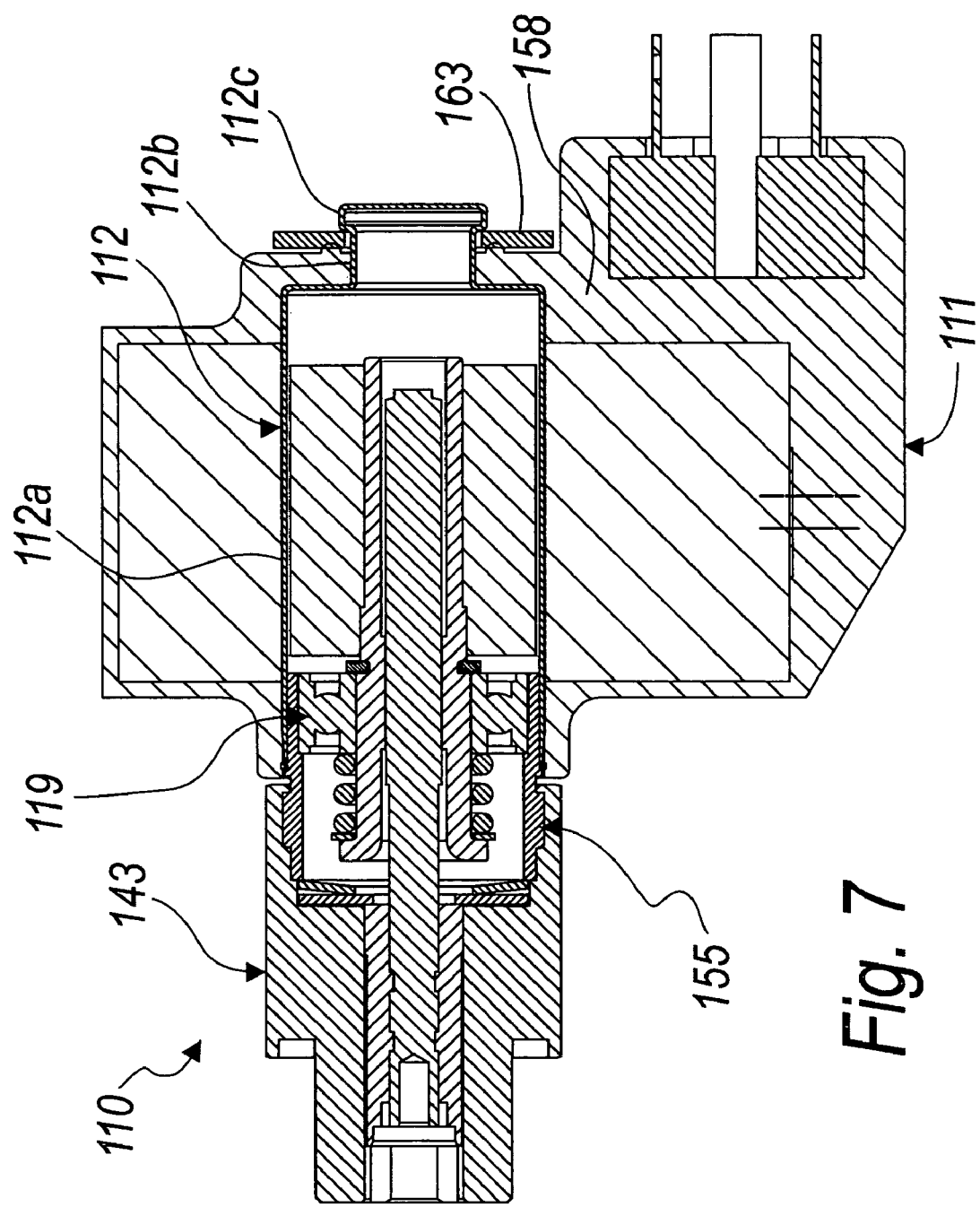
FIG. 7 is a sectional side view of a part of a valve according to the invention in a constructive variation.

In a different embodiment of the valve according to the invention, shown in FIG. 7 and designated therein by the reference numeral 110, the capsule 112 is constituted by a single element obtained by drawing, in which the tubular jacket and the bottom are monolithic.

Said drawn element is produced by a first molding operation, which forms the cylindrical jacket 112a and the neck 112b, which is suitable to protrude outward with respect to the protective sheath 158, and by a second molding operation for forming, at the outer end of the neck 112b, a locking head 112c adapted to rigidly couple the capsule 112 to the sheath 158 that covers the motor 111 and simultaneously press a sealing gasket 163, arranged so as to surround the neck 112b outside the sheath 158, against the said sheath 158.

In order to produce the capsule 112, a single component is used instead of two (the drawn element alone instead of the tubular jacket and the bottom), and the expensive operation of laser welding between the tubular jacket and the bottom is eliminated, obtaining as a whole an important saving in production costs.

This constructive variation also comprises a cup-shaped body 143, which is obtained by turning or forging.

The cup-shaped body 143 has an end 143a for connection to the valve body which is threaded so as to allow fitting on any suitable valve body provided with a corresponding complementary thread.

The cup-shaped body 143, in the embodiment described here by way of non-limiting example, is made of brass.

The radial bearing 119 is accommodated in a connecting bush 155, which is contoured so as to connect the capsule 112 to the cup-shaped body 143.

The bush 155 can be obtained from a steel pipe and therefore as a whole can be obtained at low cost with standard materials and machining.

In practice it has been found that the invention thus described solves the problems noted in known types of valve for adjusting the flow-rate of fluids, particularly refrigeration fluids.

In particular, the present invention provides a valve in which the flow control element rotates and performs a translational motion correctly with respect to its rotation axis and with respect to its direction of advancement.

Moreover, the present invention provides a valve the technical and mechanical capabilities of which are not inferior to those provided by known structures.

Further, the present invention provides a valve which is particularly flexible in terms of application and can also be adapted to refrigeration systems that have already been installed.

Moreover, the present invention provides a valve which is more standardized in its components than known types of valve, with a consequent reduction of product cost.

Accordingly, the present invention provides a valve whose assembly is not more complex than that of known types of valve.

Moreover, the present invention provides a valve for adjusting the flow-rate of fluids, particularly refrigeration fluids, which can be manufactured cheaply with known systems and technologies.

In practice, the materials employed, so long as they are compatible with the specific use, as well as the dimensions, may be any according to requirements and to the state of the art.

The disclosures in Italian Patent Application No. PD2005A000312 from which this application claims priority are incorporated herein by reference.

What is claimed is:

1. A valve for adjusting a flow-rate of fluids and an electric motor for servo-control thereof, the valve comprising: a hermetic enclosure capsule;

a valve body being fixed coaxially to said capsule and provided with intake and discharge ports; supporting means for reducing rotary friction;

a rotor component of said electric motor that is supported by said supporting means within said hermetic enclosure;

a screw-and-nut coupling mounted inside said rotor component; a flow control element which is restrained so as to perform only axial translational motions in a valve body and is coupled with said rotor component by way of said coupling; wherein said supporting means for reducing rotary friction supports said rotor component in a position that corresponds to a portion of the rotor component inside which said screw-and-nut coupling is provided;

a cup-shaped body acting as a guide for the flow control element and as a connection between said capsule and said valve body, said flow control element being constituted by a stem with a threaded shank and an opposite needle-shaped flow control end, said stem having an alignment and rotation-preventing insert overmolded thereon proximate to said flow control end, said insert being provided with edges adapted to slide in complementarily shaped slots provided within a guiding hole formed on said cup-shaped body; and further comprising a magnetic cylindrical element being forced by interference coupling on an outside region of said tubular body, said magnetic element being adapted to be crossed by a magnetic field generated by a stator component of the motor, said rotor component being constituted by a tubular body inside which a female thread for mating with said threaded shank is formed, wherein said tubular body comprises a portion adapted to engage a corresponding coaxial hole of said magnetic cylindrical element, said tubular body portion being contoured externally so as to form three contiguous cylindrical regions a radius of which increases from an end toward a central part of the tubular body, namely a first outermost region of insertion with play for alignment during assembly, a second region of insertion with interference for engagement of the tubular body with the magnetic element, and a third region within tolerance, which is adapted to ensure coaxial mechanical and magnetic coupling.

2. The valve of claim 1, wherein said flow control end is constituted by a tip coupleable with the threaded shank.

3. The valve of claim 2, comprising a tail which protrudes from the tip and a gasket, said fixing means being constituted by an axial hole, which is open at an end of the stem on which said rotation preventing insert is overmolded, said axial hole being suitable to accommodate insertion with interference of said tail that is shaped complementarily thereto, said tip also having a positioning groove for said gasket which is adapted to be inserted with interference in a complementarily shaped compartment formed at an end of the rotation-preventing insert through which said tail of the tip passes for engagement with the stem, said gasket being adapted to block a corresponding fluid passage port which the tip is adapted to enter.

4. The valve of claim 2, wherein said shank of the stem has a thread formed by way of rolling.

5. The valve of claim 2, wherein said hermetic capsule is constituted by a cylindrical tubular jacket made of non-magnetic stainless steel, which is closed on the motor side by a bottom which is sealed thereto.

6. The valve of claim 2, comprising: said valve body constituted by a drawn tubular cup, which is contoured so as to accommodate said cup-shaped body for guiding said rotation-preventing insert of the flow control element; a likewise drawn cylindrical portion protruding from a bottom of said drawn cup and being coaxial to said cup and provided with an orifice which forms the intake port for the passage of the fluid; and drawn pipes for intake and discharge of fluid at said intake and discharge ports that are connected to said valve body.

7. The valve of claim 6, wherein one of said drawn pipes, which is fixed to the valve body at said cylindrical portion has a corresponding end thereof that is beveled with such a taper as to provide at least two annular regions for contact and welding with the valve body, namely a first region on a lateral surface of said cylindrical portion, and a second region on an annular portion of said bottom of the drawn cup between said cylindrical portion and a side wall of said valve body.

8. The valve of claim 6, wherein said cup-shaped body is provided with an annular groove located at connecting flaps that connect the valve body and the jacket, said annular groove being suitable for allowing welding of said flaps.

9. The valve of claim 1, wherein said second region of insertion with interference has at least one longitudinal rotation-preventing flat portion and interference protrusions that are formed on each of said flat portions and are adapted to deform upon insertion in said corresponding hole of the magnetic element, said magnetic element being further provided with corresponding additional flat portions.

10. The valve of claim 9, wherein said tubular body is provided with elastic means and with an outer annular rim located at an end directed toward the tip of the flow control element for abutment of said elastic means for preloading an adjacent internal ring of said supporting means for reducing rotary friction.

11. The valve of claim 10, wherein said supporting means for reducing rotary friction are constituted by a radial bearing.

12. The valve of claim 11, wherein said radial bearing is provided with an outer ring and with a ring of balls and has an axial size such that the outer ring is adapted to contrast any rotation axis misalignment torques.

13. The valve of claim 10, wherein said elastic preloading means are formed by a helical spring.

14. The valve of claim 13, further comprising: a locking ring arranged in a corresponding groove formed on the tubular body, said helical spring and said radial bearing being rigidly coupled to said tubular body by way of said locking ring; a force distribution washer being interposed between the locking ring and the bearing, said washer being provided, on an internal profile region thereof, with an inclined bevel, on which the locking ring rests, said bevel being adapted to push against the locking ring in a direction for preventing extraction and for convergence toward a rotation axis of the tubular body.

15. The valve of claim 14, wherein said locking ring is made of stainless steel wire.

16. The valve of claim 14, wherein said bevel is at 45° with respect to the rotation axis.

17. The valve of claim 1, wherein said tubular body is a molded engineering polymer body.

18. The valve of claim 17, wherein said engineering polymer comprises additives which are adapted to give properties of chemical resistance to fluids in which the tubular body is immersed and self-lubricating properties with respect to metallic materials with which the tubular body is in contact.

19. The valve of claim 18, wherein the engineering polymer of which said tubular body is made contains additives such as polytetrafluoroethylene, graphite and glass fiber.

20. The valve of claim 17, wherein said magnetic cylindrical element is made of an alloy of iron boride and neodymium (NdFeB).

21. The valve of claim 20, wherein said magnetic cylindrical element is covered by a protective layer which is adapted to protect the ferromagnetic core against chemical attacks and from wear due to friction against an internal wall of the capsule inside which the magnetic cylindrical element is arranged for rotation.

22. The valve of claim 21, wherein said protective layer is made of epoxy resin.

23. The valve of claim 1, wherein the stator component of the electric motor is overmolded with a rubber-type resin which forms a protective sheath.

24. The valve of claim 23, wherein said rubber-type resin is a thermoplastic elastomer.

25. The valve of claim 24, wherein said protective sheath comprises incorporated an electrical connection for the phases of the stator component.

26. The valve of claim 25, wherein said electrical connection is provided by a terminal of a mini-DIN type, which is at least partially covered, on a side thereof directed toward an external connection, by at least one flap of resin which has sealing properties when an external connector is fitted on said terminal.

27. A valve for adjusting a flow-rate of fluids and an electric motor for servo-control thereof, the valve comprising: a hermetic enclosure capsule;

a valve body being fixed coaxially to said capsule and provided with intake and discharge ports; supporting means for reducing rotary fiction;

a rotor component of said electric motor that is supported by said supporting means within said hermetic enclosure;

a screw-and-nut coupling mounted inside said rotor component; a flow control element which is restrained so as to perform only axial translational motions in a valve body and is coupled with said rotor component by way of said coupling, wherein said supporting means for reducing rotary friction supports said rotor component in a position that corresponds to a portion of the rotor component inside which said screw-and-nut coupling is provided;

a cup-shaped body acting as a guide for the flow control element and as a connection between said capsule and said valve body, said flow control element being constituted by a stem with a threaded shank and an opposite needle-shaped flow control end, said stem having an alignment and rotation-preventing insert overmolded thereon proximate to said flow control end, said insert being provided with edges adapted to slide in complementarily shaped slots provided within a guiding hole formed on said cup-shaped body, wherein said flow control end is constituted by a tip coupleable with the threaded shank;

the valve further comprising a tail which protrudes from the tip and a gasket, said fixing means being constituted by an axial hole, which is open at an end of the stem on which said rotation preventing insert is overmolded, said axial hole being adapted to accommodate insertion with interference of said tail that is shaped complementarily thereto, said tip also having a positioning groove for said gasket which is adapted to be inserted with interference in a complementarily shaped compartment formed at an end of the rotation-preventing insert through which said tail of the tip passes for engagement with the stem, said gasket being adapted to block a corresponding fluid passage port which the tip is adapted to enter

* * * * *